(12) United States Patent
Nakane et al.

(10) Patent No.: US 6,419,322 B2
(45) Date of Patent: Jul. 16, 2002

(54) HEADREST APPARATUS FOR VEHICLE SEAT

(75) Inventors: Hidetoshi Nakane, Toyota; Kouji Miyake, Chiryu, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/770,300

(22) Filed: Jan. 29, 2001

(30) Foreign Application Priority Data

Jan. 28, 2000 (JP) ........................................ 2000-020647

(51) Int. Cl.[7] .................................................. A47C 1/10
(52) U.S. Cl. ........................................ 297/408; 297/391
(58) Field of Search ................................. 297/391, 408, 297/409, 404

(56) References Cited

U.S. PATENT DOCUMENTS

| 4,844,544 A | * | 7/1989 | Ochiai ..................... 297/391 X |
| 5,181,763 A | * | 1/1993 | Dellanno et al. ........ 297/408 X |
| 5,660,441 A | * | 8/1997 | Nagayasu et al. .......... 297/408 |
| 5,667,275 A | * | 9/1997 | Takeda .................... 297/391 X |
| 5,683,141 A | * | 11/1997 | Wakamatsu et al. ........ 297/408 |
| 5,765,918 A | * | 6/1998 | Wakamatsu et al. ........ 297/408 |
| 5,906,414 A | * | 5/1999 | Rus ............................. 297/408 |
| 6,129,421 A | * | 10/2000 | Gilson et al. ............... 297/408 |
| 6,183,045 B1 | * | 2/2001 | Marfilius et al. ....... 297/408 X |

FOREIGN PATENT DOCUMENTS

| JP | 9-382 | 1/1997 |
| JP | 9-117347 | 5/1997 |

* cited by examiner

*Primary Examiner*—Peter M. Cuomo
*Assistant Examiner*—Stephen Vu
(74) *Attorney, Agent, or Firm*—Burns, Doane, Swecker & Mathis, LLP

(57) ABSTRACT

A headrest apparatus for a vehicle seat includes a stay, a headrest frame and a headrest pad covering the headrest frame. The stay has a pair of vertical posts to be supported by the seat back of the vehicle seat and a horizontal rod connecting the vertical posts. The headrest frame includes a body portion, a connecting portion which hangs the body portion on the horizontal rod in a manner allowing the headrest frame to swing, and spaces between the body portion and the vertical posts to permit the swinging movement of the headrest frame.

13 Claims, 4 Drawing Sheets

HEADREST APPARATUS FOR VEHICLE SEAT

This application is based on and claims priority under 35 U.S.C. § 119 with respect to Japanese Application No. 2000-020647 filed on Jan. 28, 2000, the entire content of which is incorporated herein by reference.

FIELD OF THE INVENTION

The present invention generally relates to vehicle seats. More particularly, the present invention pertains to a headrest apparatus for a vehicle seat.

BACKGROUND OF THE INVENTION

An example of a known headrest apparatus for a vehicle seat is disclosed in Japanese Patent Laid-Open Publication No. 9(1997)-382. The headrest apparatus disclosed in this published application includes a headrest main body comprised of a stay, a headrest frame and a pad. The stay has a pair of vertical stick portions and a horizontal stick portion connecting together both of the vertical stick portions. Each of the vertical stick portions is supported by the seat back of the vehicle. The width of the headrest frame is shorter than the length of the horizontal stick portion. A connecting portion is provided at the bottom end of the headrest frame. This connecting portion connects the headrest frame with the stay in a manner allowing relative rotation via a frictional material. The pad is made from polyurethane and covers the entire headrest frame, the horizontal stick portion of the stay and the upper portions of each of the vertical stick portions. The pad includes two slits portions which allow the stay to move without interfering with the pad, when the headrest main body swings on the horizontal stick portion of the stay.

In this known headrest apparatus, complex injection mold forming dies are needed for forming the pad because two core dies must be inserted into the injection mold forming dies to form the two slits. Therefor, the cost associated with making the headrest assembly is increased and the manufacturing process is relatively time consuming.

Further, based on human engineering research, it is desirable that the passenger head be supported by the head rest with a minimal clearance at the point A as shown in FIG. 1. Also, the surface of the headrest below point A which is along the passenger head profile for supporting the passenger head with wide head rest surface can give the passenger a more comfortable feeling. This head rest arrangement can also provide better absorption of impact in an emergency such as a collision.

To realize the above-mentioned requirements, the connecting portion between the frame of the headrest and the stay must be disposed at the upper portion of the frame. This structure requires longer vertical stick portions covered by the pad. Accordingly, the core dies for forming large width and depth of the slits of the pad become larger. As a result, the manufacture of the headrest apparatus not only becomes expensive, but also makes the mold forming process more complex.

A need thus exists for a vehicle seat headrest apparatus which is not as expensive to manufacture and not as complex in structure, while at the same time providing the desired degree of support and comfort for the seat occupant.

SUMMARY OF THE INVENTION

In light of the foregoing, the present invention provides a headrest apparatus for a vehicle seat that includes a stay, a headrest frame and a headrest pad covering the headrest frame. The stay has a pair of vertical posts to be supported by the seat back of the vehicle seat and a horizontal rod connecting the vertical posts. The headrest frame includes a body portion, a connecting portion which hangs the body portion on the horizontal rod in a manner allowing the headrest frame to swing, and spaces between the body portion and the vertical posts to permit the swinging movement of the headrest frame.

According to another aspect of the present invention, a headrest assembly for a vehicle seat includes a stay, a headrest frame, and a headrest pad covering the headrest frame. The stay has a pair of vertical posts and a horizontal rod, with each of the vertical posts being adapted to be supported by a seat back of the vehicle seat and the horizontal rod connecting together the vertical posts. The headrest frame includes first and second frame pieces connected together by a connecting portion. The first and second frame pieces define a body portion. The connecting portion frictionally engages the horizontal rod to permit the connecting portion to be rotated in the forwarded and backward direction relative to the horizontal rod to adjust the position of the headrest frame relative to the stay while also permitting the headrest frame to be maintained at a desired position through the frictional engagement between the connecting portion and the horizontal rod. A part of the body portion surrounds the vertical posts and has an internal dimension in the forward and backward directions that is greater than an outer dimension of the vertical posts to permit the headrest frame to rotate relative to the stay over a range of movement.

In accordance with another aspect of the invention, a method for assembling a vehicle seat headrest assembly involves positioning at least one vertical post of a stay in a channel of one frame piece forming part of a headrest frame while also positioning a horizontal rod of the stay that is connected to the vertical post in a connecting portion of the headrest frame that connects the one frame piece to another frame piece. The one frame piece and the other frame piece are then brought together to cause the connecting portion to encircle and frictionally engage the horizontal rod while the vertical post is positioned in the channel with a space existing between an interior surface of the channel and an exterior surface of the vertical post to permit the vertical post to move in a forward and backward direction in the channel.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
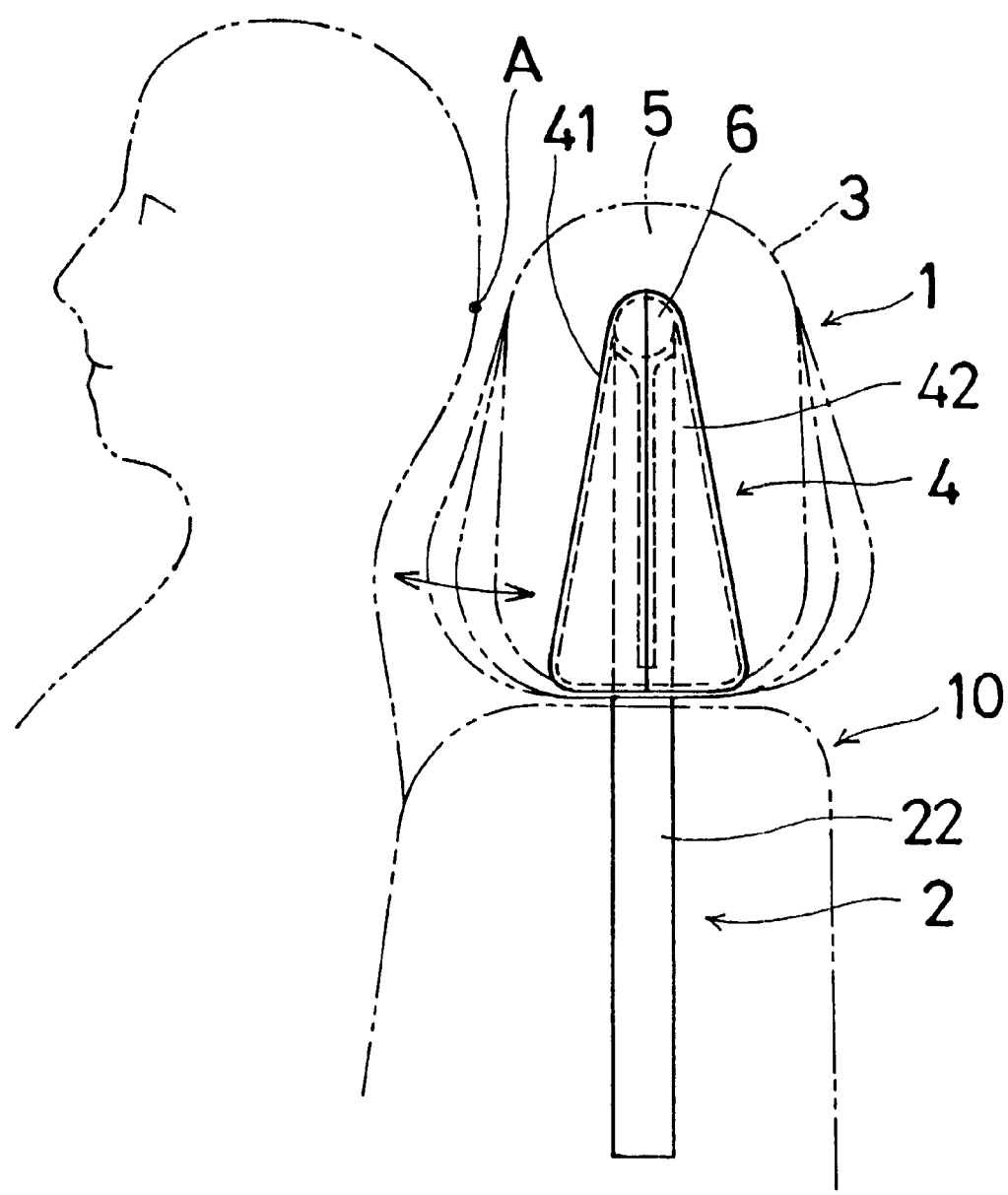
FIG. 1 is a side view of a headrest apparatus in accordance with the present invention.
Figure 2:
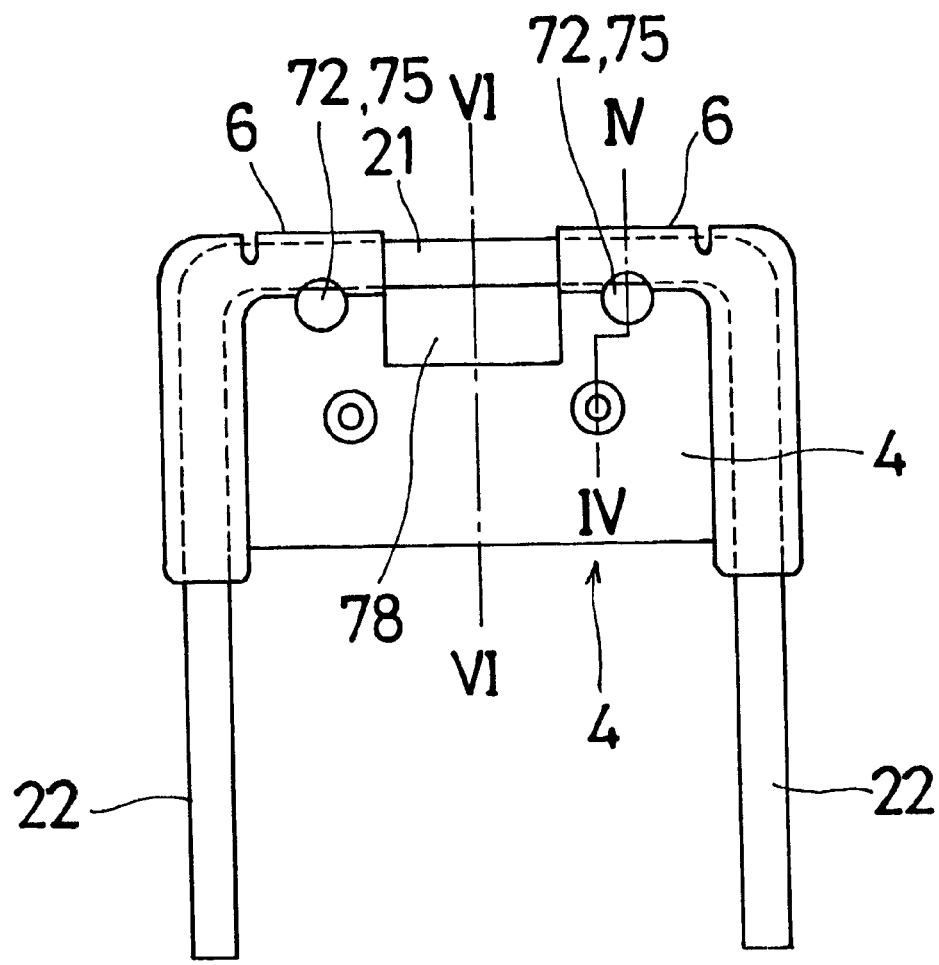
FIG. 2 is a front view of the headrest frame and stay of the headrest apparatus of the present invention.

The drawing figures illustrate various features and details associated with the headrest apparatus or assembly 1 for a vehicle seat in accordance with the present invention. The headrest assembly is adapted to support the head of the passenger sitting on the vehicle seat. Referring to FIG. 1, the headrest apparatus 1 includes a stay 2 and a headrest main body 3. The stay 2 supports the headrest main body 3 over or above the seat back 10 of the vehicle seat. As shown in FIG. 2, the stay 2 is comprised of a pair of vertical posts or stick portions 22, 22 and a horizontal rod or stick portion 21. Each end of the horizontal rod 21 is connected to one of the vertical posts 22. The stay 2 thus possesses a generally upside-down U-shaped configuration. The cross section of the horizontal rod 21 and preferably also the vertical posts 22, 22 is round. Both of the vertical posts 22 are supported by or extend into the seat back 10.

The headrest main body 3 is comprised of a frame 4 which is connected with the horizontal rod 21 and is able to swing on the horizontal rod 21, and a pad 5 which covers the frame 4. The frame 4 forms a rigid body member of the headrest apparatus 1. The frame 4 hangs from the horizontal rod 21 of the stay 2 at its connecting portions 6. The pad 5 is made from polyurethane foam and covers the entire frame 4.

Figure 3:
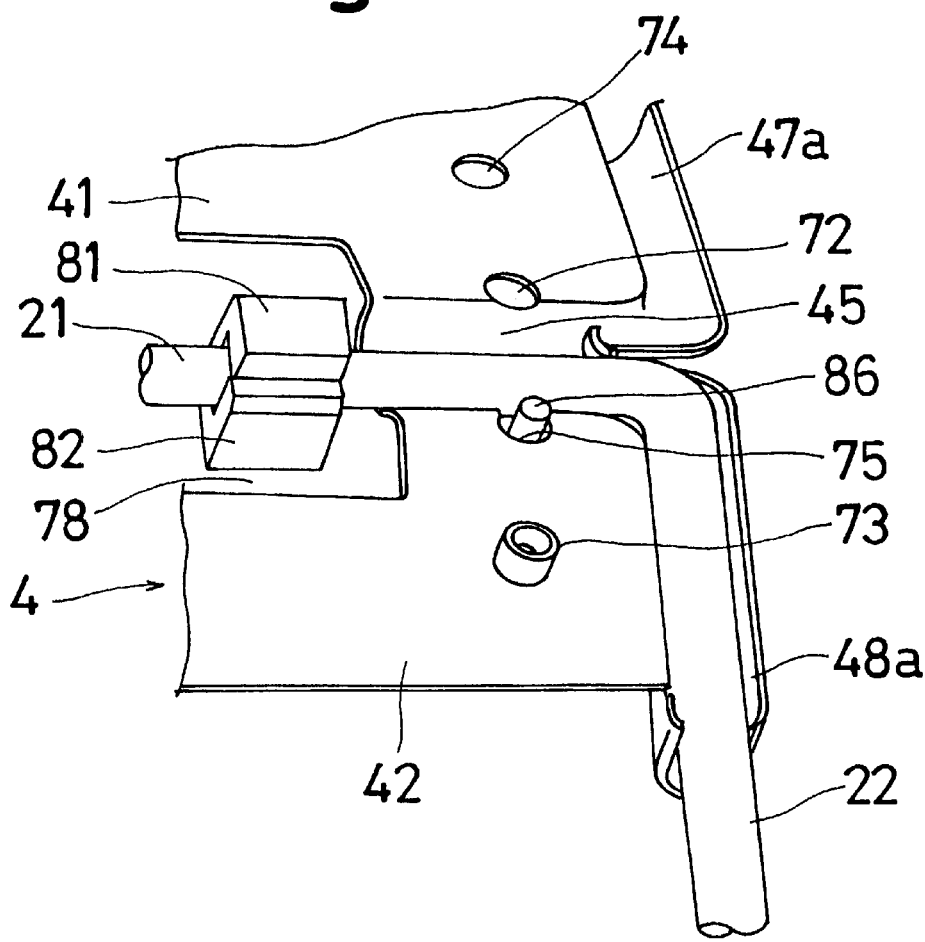
FIG. 3 is a perspective view of a portion of the headrest frame and stay in accordance with the present invention illustrating a jig that is used to fasten or secure the stay.

The method of assembling the headrest main body 3 is as follows. As shown in FIG. 3, the frame 4 is made from a piece of steel sheet, for example by a stamping operation. The frame 4 is comprised of a front frame piece or first frame piece 41, a rear frame piece or second frame piece 42 and a trough-shaped or generally U-shaped bending portion 45 located between the front frame piece 41 and the rear frame piece 42. As illustrated in FIGS. 2 and 3, a jig hole or cutout 78 is disposed at the center of the frame 4. The jig hole 78 separates the bending portion 45 into two separated bending portions as shown in FIG. 2. The front frame piece 41 is provided with a pair of first holes 72, a pair of second holes 74 and a pair of channels 47a (only one of which is shown in FIG. 3). The rear frame piece 42 is provided with a pair of first holes 75, and a pair of channels 48a (only one of which is shown in FIG. 3). The diameter of each of the first holes 75 in the rear frame piece 42 is the same as or generally the same as that of the first holes 72 in the front frame piece 41.

In addition, the rear frame piece 42 is provided with a pair of cylindrical burring portions or raised cylindrical portions 73. The diameter of each raised cylindrical portions 73 is smaller than that of the second holes 74 in the front frame piece 41 so that each of the cylindrical burring portions 73 can be inserted into one of the first holes 74 in the front frame piece 41. Each channels of the 47a, 48a gradually deepens (i.e., becomes gradually deeper) from the bending portion 45 to the end portions 47, 48 of the channels 47a, 48a shown in FIG. 5.

Figure 4:
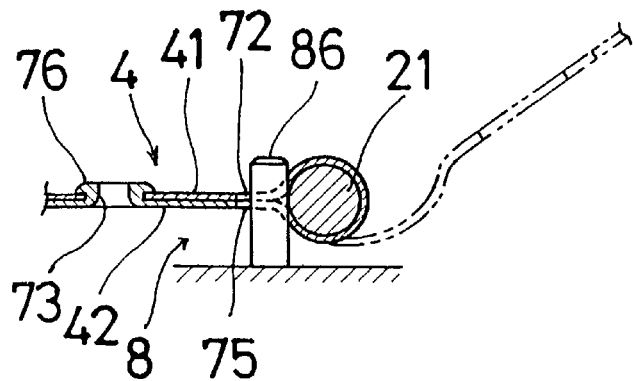
FIG. 4 is a cross sectional view taken along the section line IV—IV of FIG. 2.
Figure 5:
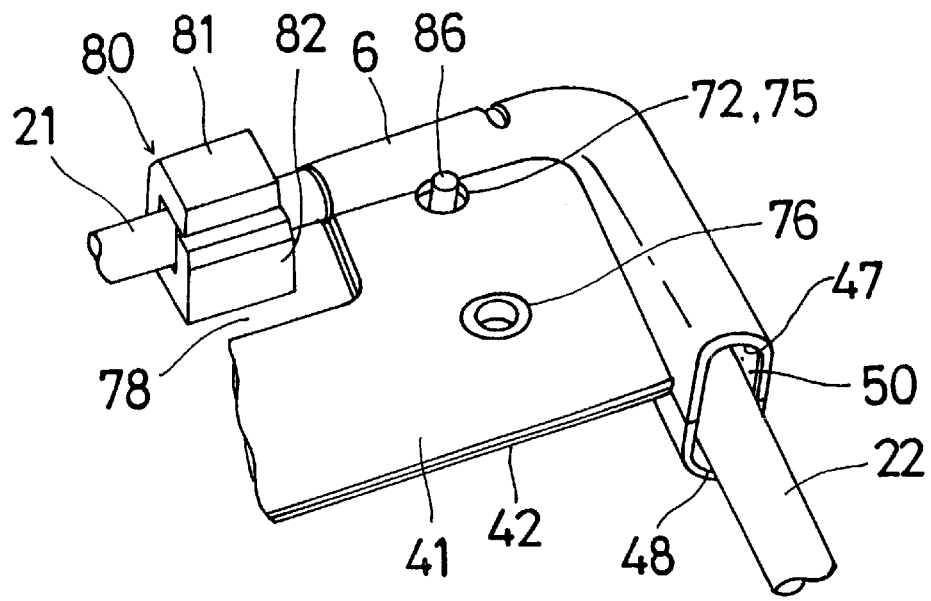
FIG. 5 is a perspective view of a portion of the frame and the stay used in the headrest apparatus in accordance with the present invention, illustrating the frame being burring-caulked.
Figure 6:
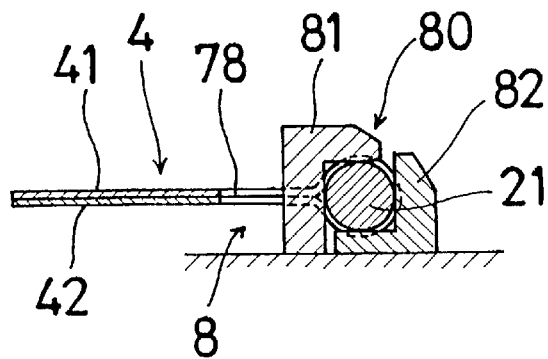
FIG. 6 is a cross sectional view taken along the section line VI—VI of FIG. 2.

Referring to FIGS. 3–5, a jig 8 includes a clamp 80 and one pair of pins 86 (only one of which is shown in FIGS. 3–5). The clamp 80 is comprised of an upper nail 81 and a lower nail 82. The upper nail 81 and the lower nail 82 of the clamp 80 fix the horizontal rod 21 as shown in FIGS. 3 and 5. Each pin 86 is inserted into one of the holes 75 of the rear frame piece 42 to hold the horizontal rod 21 against the strong bending force applied when the bending portion 45 is bent. The bending portion 45 is tightly bent around the horizontal rod 21 of the stay 2, with the frame 4 being rotatable on the horizontal rod 21 in the presence of a friction force. As shown in FIG. 4, the front frame piece 41 is folded onto the rear frame piece 42 while the bending portion 45 is bent. During this bending process, each of the first holes 72 of the front frame place 41 becomes generally aligned with a respective one of the first holes 75 of the rear frame piece 42 and so each of the pins 86 in the first holes 75 of the rear frame piece 42 also extend or become inserted into respective ones of the first holes 72 of the front frame place 41 to thus hold the stay 2 and the frame 4. As shown in FIG. 5, spaces 50 exist around the vertical posts 22, 22 at both sides of the frame 4. During the bending process, each of the second holes 74 in the front frame piece 41 becomes generally aligned with the respective one of the raised cylindrical portions 73 so that the raised cylindrical portions 73 are each positioned in the respective second hole 74 in the front frame piece 41.

After the bending process described above, the top 76 of each raised cylindrical portion 73 is, for example, pressed downwardly or otherwise deformed in the manner shown in FIG. 4 (so-called burring-caulked) to fix the folded shape of the frame 4 in the illustrated configuration. In the illustrated configuration shown in FIGS. 2 and 5, a friction force exists or is generated between the bending portion 45 of the frame 4 and the horizontal rod 21. In addition, the frame 4 is held around the horizontal rod 21 within a predetermined angular range defined by the width or depth of the spaces 50 in the fore and aft direction. The frame 4 can thus rotate around the horizontal rod 21 of the stay 2 until the vertical posts 22 contact the front or rear end portions 47, 48 of the spaces 50. Thus, in the finished state, the bending portion 45 forms a connecting portion of the frame 4 that hangs from the horizontal rod 21 and is able to swing about the horizontal rod 21, while the front and rear frame pieces 41, 42 form a body portion of the frame 4 that is connected to the connecting portion 45 and able to swing with the connecting portion.

Once the configuration shown in FIGS. 2 and 5 is achieved, the jig 8 is unfastened from the stay 2, and the pad 5 is formed on the assembly that includes the frame 4 in the manner shown in FIG. 1. The forming method for forming the pad 5 involves so-called injection molding. This involves inserting the frame 4 with the stay 2 into an injection molding die and injecting polyurethane foam which constitutes the material of the pad 5. A slight flow of the polyurethane foam into the space between the bending portion 45 and the horizontal rod 21 through the jig hole 78, the holes 72 or the holes 75 does not disturb the rotatable nature of the frame 4 with respect to the stay 2.

The part of the body portion of the frame that surrounds the vertical posts has an interior dimension that is greater than the outer dimension of the vertical posts 22, thus allowing the body portion (i.e., the front and rear frame pieces 41, 42) to swing about the horizontal rod 21. In addition, as noted above, the channels 47a, 48a which form the spaces 50 between the vertical posts 22 and the frame 4 and which allow the frame to rotate on the horizontal rod 21 have a depth that varies, becoming deeper towards the ends 47, 48 as shown in FIG. 5. Thus, the space 50 possesses a varying width or depth in the fore and aft direction that increases towards the ends 47, 48, thus allowing the pivoting or rotating movement of the frame 4 and the pad 5 on the horizontal rod 21. It can this be seen that the bending portion 45 of the frame 4 frictionally engages the horizontal rod 21 of the stay 2 whereas the channels 47a, 48a are spaced from the vertical posts 22 in a way that defines the spaces 50.

According to the present invention, as the bending portion 45 of the frame 4 is bent around the horizontal rod 21, the bending portion 45 engages the horizontal rod 21 of the stay 2 with a frictional force. This frictional force allows the stay 2 to support the frame 4 at an adjusted position. That is, when a passenger desires to change the angle of the frame and pad, he or she can rotate the frame 4 or pad 5 around the horizontal rod 21 within the predetermined angle against this frictional force. In addition, as the vertical posts 22, 22 are covered or enclosed by the frame 4, the vertical posts 22, 22 do not interfere with the frame 4. Thus, molding core dies are not needed to form spaces in the pad 5 in the same manner as the known headrest apparatus described above.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A headrest apparatus for a vehicle seat comprising:
   a stay that includes a pair of vertical posts and a horizontal rod, each of the vertical posts being adapted to be supported by a seat back of the vehicle seat, the horizontal rod connecting together the vertical posts;
   a headrest frame that includes a connecting portion hanging on the horizontal rod in a manner allowing the connecting portion to swing on the horizontal rod and a body portion connected to the connecting portion to swing on the horizontal rod with the connecting portion, portions of the body portion surrounding portions of the vertical posts with spaces between portions of the body portion and portions of the vertical posts surrounded by the body portion;
   the horizontal rod of the stay being positioned at an upper portion of the headrest frame, with the body portion of the headrest frame extending downwardly away from the connecting portion; and
   a headrest pad covering the headrest frame.

2. The headrest apparatus for a vehicle seat according to claim 1, wherein each of the spaces provide clearance between an inside surface of the headrest frame and an outside surface of the vertical posts, the spaces having an elongated shape in a front and rear direction to define a range of swinging movement of the headrest frame relative to the stay.

3. The headrest apparatus for a vehicle seat according to claim 2, wherein the body portion of the headrest frame is comprised of a front frame piece and a rear frame piece, the front frame piece and the rear frame piece being connected by virtue of at least one raised cylindrical portion on the rear frame piece passing through a hole in the front frame piece.

4. The headrest apparatus for a vehicle seat according to claim 3, wherein both side ends of each of the front frame piece and the rear frame piece have channel portions that define the spaces.

5. The headrest apparatus for a vehicle seat according to claim 3, wherein the headrest frame is made of a stamped metal sheet.

6. The headrest apparatus for a vehicle seat according to claim 5, wherein the body portion of the headrest frame includes a cutout portion.

7. The headrest apparatus for a vehicle seat according to claim 1, wherein substantially the entire body portion is located below the horizontal rod of the stay.

8. The headrest apparatus for a vehicle seat according to claim 1, wherein the horizontal rod is positioned along an uppermost periphery of the headrest frame.

9. A headrest assembly for a vehicle seat comprising:
   a stay that includes a pair of vertical posts and a horizontal rod, each of the vertical posts being adapted to be supported by a seat back of the vehicle seat, the horizontal rod connecting together the vertical posts;
   a headrest frame that includes first and second frame pieces connected together by a connecting portion, the first and second frame pieces defining a body portion, the connecting portion frictionally engaging the horizontal rod to permit the connecting portion to be rotated in a forwarded and backward direction relative to the horizontal rod to adjust the position of the headrest frame relative to the stay while also permitting the headrest frame to be maintained at a desired position through the frictional engagement between the connecting portion and the horizontal rod, a part of the body portion surrounding the vertical posts and having an internal dimension in the forward and backward directions that is greater than an outer dimension of the vertical posts to permit the headrest frame to rotate relative to the stay over a range of movement; and
   a headrest pad covering the headrest frame.

10. The headrest apparatus for a vehicle seat according to claim 9, wherein the internal dimension of the part of the body portion surrounding the vertical posts varies.

11. The headrest apparatus for a vehicle seat according to claim 9, wherein the second frame piece includes an upstanding extension that is positioned in a hole in the first frame piece.

12. The headrest apparatus for a vehicle seat according to claim 9, wherein the connecting portion is defined by two spaced bending portions that are separated by a cutout.

13. The headrest apparatus for a vehicle seat according to claim 9, wherein the headrest frame is made of a stamped metal sheet.

* * * * *